US010750229B2

(12) United States Patent
Akselrod et al.

(10) Patent No.: US 10,750,229 B2
(45) Date of Patent: Aug. 18, 2020

(54) SYNCHRONIZED MULTI-MEDIA STREAMS INCLUDING MOOD DATA

(71) Applicant: INTERNATIONAL BUSINESS MACHINES CORPORATION, Armonk, NY (US)

(72) Inventors: Ben Z. Akselrod, Givat Shmuel (IL); Anthony Di Loreto, Markham (CA); Steve McDuff, Markham (CA); Kyle D. Robeson, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 15/789,259

(22) Filed: Oct. 20, 2017

(65) Prior Publication Data
US 2019/0124390 A1    Apr. 25, 2019

(51) Int. Cl.
| | | |
|---|---|---|
| G06F 15/16 | (2006.01) | |
| H04N 21/43 | (2011.01) | |
| H04L 29/06 | (2006.01) | |
| H04N 21/433 | (2011.01) | |
| H04N 21/435 | (2011.01) | |
| H04N 21/8547 | (2011.01) | |
| G06F 16/44 | (2019.01) | |

(52) U.S. Cl.
CPC ......... *H04N 21/4302* (2013.01); *G06F 16/44* (2019.01); *H04L 65/601* (2013.01); *H04L 65/602* (2013.01); *H04L 65/605* (2013.01); *H04L 65/607* (2013.01); *H04N 21/433* (2013.01); *H04N 21/435* (2013.01); *H04N 21/8547* (2013.01)

(58) Field of Classification Search
CPC .. H04N 21/43; H04N 21/4302; H04L 65/601; H04L 67/22
See application file for complete search history.

(56) References Cited

U.S. PATENT DOCUMENTS

| | | |
|---|---|---|
| 5,683,253 A | 11/1997 | Park et al. |
| 6,980,149 B1 | 12/2005 | Meyer |
| 7,243,104 B2 | 7/2007 | Bill |

(Continued)

FOREIGN PATENT DOCUMENTS

EP    2876847    5/2015

OTHER PUBLICATIONS

Anonymous, "Take control of your Anxiety and Sleep", Thync, http://www.thync.com/, accessed Jun. 5, 2017, 3 pages.
(Continued)

*Primary Examiner* — Yves Dalencourt
(74) *Attorney, Agent, or Firm* — William Hartwell; Andrew D. Wright; Roberts Calderon Safran & Cole, P.C.

(57) ABSTRACT

Systems and methods for generating synchronized multimedia streams including mood data are disclosed. In one embodiment, a computer-implemented method comprises: obtaining, by a computing device, one or more primary streams of data; creating, by the computing device, digital mood data that is synchronized with the one or more primary streams of data, wherein the digital mood data is configured for use by a wearable mood device; and storing, by the computing device, the digital mood data in a multimedia container with the one or more primary streams of data.

20 Claims, 7 Drawing Sheets

(56) References Cited

U.S. PATENT DOCUMENTS

| | | |
|---|---|---|
| 7,921,067 B2 | 4/2011 | Kemp et al. |
| 7,979,886 B2 | 7/2011 | Frojdh et al. |
| 8,170,702 B2 | 5/2012 | Kemp et al. |
| 8,260,189 B2 | 9/2012 | Chainer et al. |
| 8,373,768 B2 | 2/2013 | Bill |
| 8,443,290 B2 | 5/2013 | Bill |
| 8,700,009 B2 | 4/2014 | Quy |
| 8,763,060 B2 | 6/2014 | Jerremy |
| 8,805,854 B2 | 8/2014 | Chen et al. |
| 8,903,494 B2 | 12/2014 | Goldwasser et al. |
| 8,948,893 B2 | 2/2015 | Abuelsaad et al. |
| 9,002,458 B2 | 4/2015 | Pal et al. |
| 9,014,811 B2 | 4/2015 | Pal et al. |
| 9,019,087 B2 | 4/2015 | Bakircioglu et al. |
| 9,201,866 B2 | 12/2015 | Lehman et al. |
| 9,233,244 B2 | 1/2016 | Pal et al. |
| 2012/0020413 A1 | 1/2012 | Chen et al. |
| 2012/0198507 A1 | 8/2012 | Geiling et al. |
| 2012/0226706 A1 | 9/2012 | Choi et al. |
| 2014/0214848 A1* | 7/2014 | Devkar ................. G06F 16/285 707/740 |
| 2015/0199010 A1 | 7/2015 | Coleman et al. |
| 2015/0324348 A1* | 11/2015 | Peterson ................ G06F 17/241 704/9 |
| 2015/0338917 A1* | 11/2015 | Steiner ................... H04L 9/3231 345/156 |
| 2018/0176312 A1* | 6/2018 | Smietana ................ H04L 67/22 |

OTHER PUBLICATIONS

Schulzrinne et al. "RPID: Rich Presence Extensions to the Presence Information Data Format (PIDF)", https://tools.ietf.org/html/rfc4480#section-3.5, Jul. 2006, 38 pages.

Wagner, "Home Theater Chair Vibrates in Sync With a Movies Action", Mashable, http://mashable.com/2013/09/29/home-theater-chair-vibrates/#Ko7X2rkbRgqJ, Sep. 29, 2013, 6 pages.

* cited by examiner

```
{
    "_streamType": "mood"
    "_streamTypeVersion": "1.0",
    "entries": [
            {
              "startTick": 0,
              "stopTick": 10000,
              "moodType": "RELAXED",
              "intensity": 10
        },
        {
              "startTick": 50000,
              "stopTick": 65000,
              "moodType": "SCARY",
              "intensity": 4
        }
    ]
}
```

```
{
    "_streamType": "compositeMood"
    "_streamTypeVersion": "1.0",
    "identifiers": [
        {
            "name": "alice",
            "desc": "protagonist"
        },
        {
            "name": "bob",
            "desc": "supporting character"
        },
        {
            "name": "scene",
            "desc": "general scene mood"
        }
    ],
    "entries":  [
        {
            "id": "alice",
            "timeCode": "00:02:17.440",
            "duration": "00:00:15.000",
            "moodType": "RELAXED",
            "intensity": 10
        },
        {
            "id": "scene",
            "timeCode": "00:02:17.440",
            "duration": "00:04:10.000",
            "moodType": "SOMBER",
            "intensity": 6
        },
        {
            "id": "bob",
            "timeCode": "00:02:20.500",
            "duration": "00:00:20.000",
            "moodType": "ENERGIZED",
            "intensity": 4
        }
```

FIG. 6

SYNCHRONIZED MULTI-MEDIA STREAMS INCLUDING MOOD DATA

BACKGROUND

The present invention relates generally to multi-media streams including mood data and, more particularly, to systems and methods for generating and utilizing mood data in conjunction with synchronized multi-media data streams.

Wearable devices of all types have been increasing in popularity. Recently, wearable neurostimulation technology has become available to consumers, which aims at modifying a subjects' cognitive state utilizing transdermal electrical stimulation (TES).

In another technological field, technicians have developed various methods and systems for modifying streams of digital data for use with various user devices. For example, various methods have been developed for packaging synchronized video and audio data streams in multi-media containers or encapsulation units for use in displaying movies or television shows on televisions, computers and the like. Some multi-media containers include a codec for use by a user device in decoding/encoded video and/or audio data received at the device.

One technique for providing video data comprises the use of audio and video encoders to encode respective sources of audio and video data. The audio and video encoders feed video and audio data to an encapsulation unit, which assembles the synchronized audio and video data into a container for output to a destination device. The destination device then utilizes a decapsulation unit to decapsulate elements of the container into video and audio streams, and sends the video and audio streams to respective video and audio decoders for decoding. The decoded video and audio streams may then be utilized by audio and video outputs of the destination device. Such digital processing techniques enable manipulation by technicians of digital video data to enhance a consumer's viewing experience. For example, technicians may incorporate closed-captioning data, subtitling, or 3-dimensional (3-D) data that is synchronized or otherwise tied to corresponding portions of associated video and audio data.

SUMMARY

In an aspect of the invention, a computer-implemented method includes: obtaining, by a computing device, one or more primary streams of data; creating, by the computing device, digital mood data that is synchronized with the one or more primary streams of data, wherein the digital mood data is configured for use by a wearable mood device; and storing, by the computing device, the digital mood data in a multimedia container with the one or more primary streams of data.

In another aspect of the invention, there is a computer program product for generating synchronized multimedia streams including mood data. The computer program product comprises a computer readable storage medium having program instructions embodied therewith. The program instructions are executable by a computing device to cause the computing device to: obtain one or more primary streams of data; and generate mood data that is synchronized with the one or more primary streams of data, the mood data comprising: a mood stream identifier; a mood type; a mood intensity; a duration of a mood; and a timestamp for synchronizing the mood data with the one or more primary streams of data, wherein the mood data is configured to be utilized by a mood device to provide stimulation to a user.

In another aspect of the invention, there is a system for generating synchronized multimedia streams including mood data. The system includes a CPU, a computer readable memory and a computer readable storage medium associated with a computing device. The system also includes: program instructions to obtain an encoded stream of video data; program instructions to obtain an encoded stream of audio data; program instructions to create an encoded stream of digital mood data synchronized with the encoded stream of video data and the encoded stream of audio data using timestamps, wherein the digital mood data is configured for use by a mood device to provide stimulation to a user; program instructions to store the encoded stream of video data, the encoded stream of audio data, and the encoded stream of digital mood data in a multimedia container; and program instructions to store the multimedia container in a database accessible to one or more remote user computer devices, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows exemplary mood data associated with characters of a movie in accordance with embodiments of the present invention.

DETAILED DESCRIPTION

Figure 1:
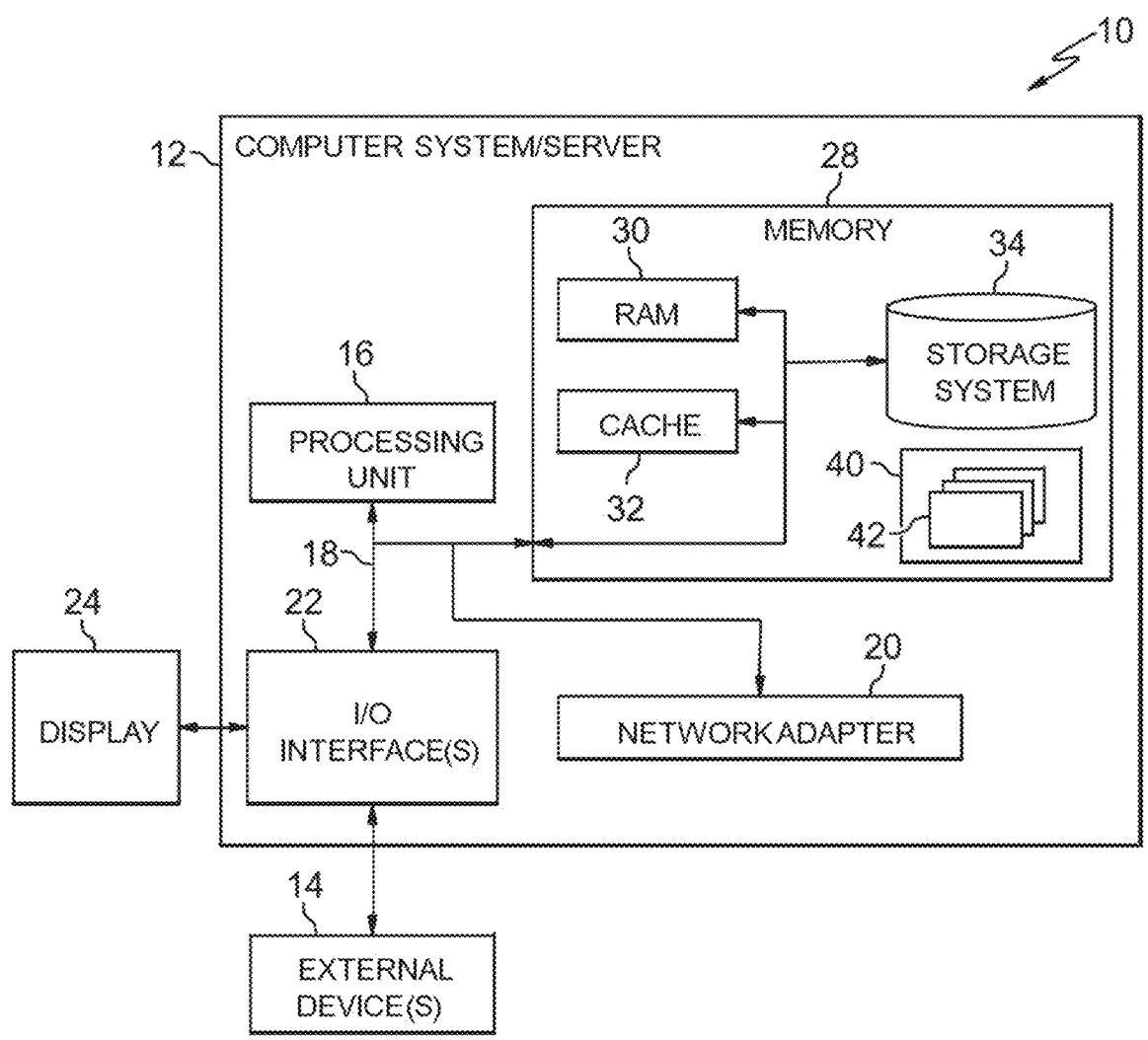
FIG. 1 depicts a computing infrastructure according to an embodiment of the present invention.

The present invention relates generally to multi-media streams including mood data and, more particularly, to systems and methods for generating and utilizing mood data in conjunction with synchronized multi-media data streams. In embodiments, one or more mood streams are encoded/decoded using a mood codec and are stored in a multimedia container. The term multimedia container as used herein refers to a metafile format whose specification describes how different elements of data and metadata coexist in a computer file. Multimedia containers of the present invention may include multiple audio and video streams, one or more mood streams, meta-data, and synchronization information needed for playback of the various data streams together, along with any other data typical of multimedia containers (e.g., subtitles and chapter-information). Multimedia containers of the invention may include or be accompanied by codec for decoding data streams of the multimedia container. Furthermore, in embodiments, multiple mood tracks are stored in a multimedia container either individually or as a composite mood stream. In embodiments, each mood track corresponds to moods associated with a different character in a movie or show, or a mood related to the atmosphere of the current scene. Thus, embodiments of the invention enable users to choose which mood track to experience while viewing a movie, based on a character or scene in the movie. In aspects, a wearable device conveys mood information to a user based on a mood stream in a multimedia container.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
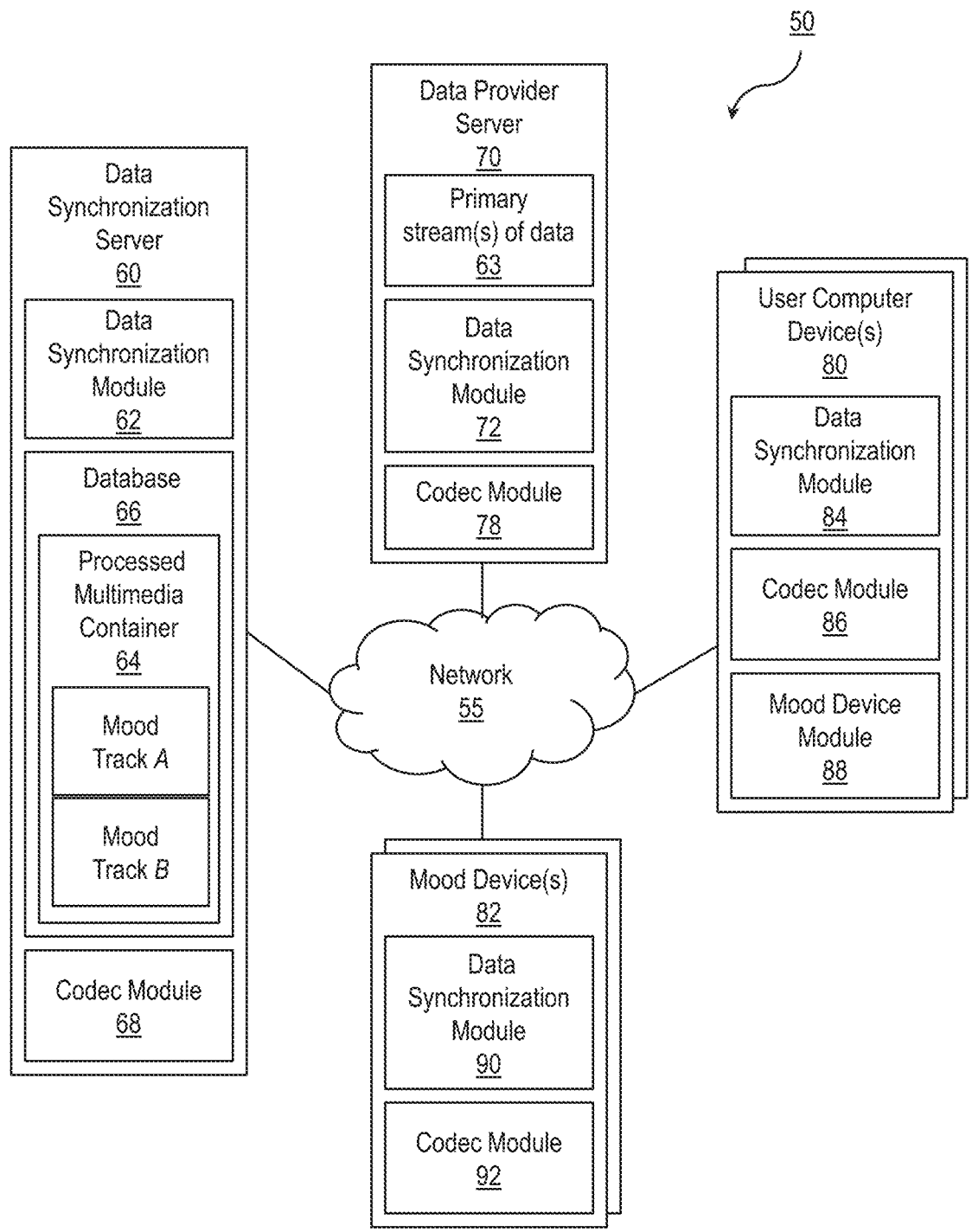
FIG. 2 shows an exemplary environment in accordance with aspects of the invention.

FIG. 2 shows an exemplary system 50 in accordance with aspects of the invention. The system 50 includes a network 55 connected to a data synchronization server 60. The data synchronization server 60 may comprise a computer system 12 of FIG. 1, and may be connected to the network 55 via the network adapter 20 of FIG. 1. The data synchronization server 60 may be configured as a special purpose computing device that is part of a multimedia content provider.

The network 55 may be any suitable communication network or combination of networks, such as a local area network (LAN), a general wide area network (WAN), and/or a public network (e.g., the Internet).

In aspects, the data synchronization server 60 includes one or more program modules (e.g., program module 42 of FIG. 1) executed by the data synchronization server 60. In embodiments, the data synchronization server 60 includes a data synchronization module 62 for synchronizing streams of mood data (e.g., neurostimulation data) with one or more primary streams of data (e.g., primary streams of data 63), and storing the steams of mood data with the primary streams of data in a multimedia container (e.g., processed multimedia container 64). In aspects, one or more processed multimedia containers 64 are stored in a database 66 of the data synchronization server 60. In embodiments, the processed multimedia container 64 may contain multiple mood tracks, illustrated herein as mood track A and mood track B. Mood tracks may be in the form of separate mood data streams or a single consolidated mood data stream. In embodiments, mood track A comprises a first stream of mood data and mood track B comprises a second stream of mood data, wherein mood track A is different from mood track B. For example, the mood track A may comprise mood data associated with the changing emotions of a first character in a movie, while the mood track B may comprise mood data associated with the changing emotions of a second character in the movie.

The data synchronization server 60 may also include a codec module 68 for encoding and/or decoding the one or more primary streams of data 63 and/or one or more streams of mood data handled by the data synchronization module 62. The data synchronization module 62 and the codec module 68 may utilize existing multimedia container packaging technology, such as technology currently utilized in the packaging of data streams for digital movies.

In embodiments, the data synchronization module 62 obtains one or more primary streams of data 63 from a data provider server 70 via the network 55. In one example, data provider server 70 is a server managed by a content provider that provides the data synchronization server 60 with prepackaged multimedia containers including synchronized video and audio data (e.g., movie containers) through the network 55, which may then be further processed by the data synchronization server 60 to incorporate one or more streams of mood data to produce a processed multimedia container 64 of the invention.

In embodiments, the data provider server 70 includes a data synchronization module 72 for synchronizing and packaging one or more primary data streams (e.g., primary streams of data 63) in a multimedia container, which may then be provided to the data synchronization server 60. In aspects, the data provider server 70 may utilize a codec module 78 for encoding and/or decoding components of the one or more primary streams of data 63 (e.g., video data stream and audio data stream). The data synchronization module 72 and the codec module 78 may utilize existing multimedia container packaging technology, such as technology currently utilized in the packaging of data streams for digital movies.

The network 55 may connect the data synchronization server 60 with more or more user computer devices 80 (hereafter referred to as the user computer device 80). The user computer device 80 may comprise components of the computer system 12, and may be a desktop computer, laptop computer, tablet computer, smartphone, smart television, etc. In embodiments, the user computer device 80 is in communication, either directly or indirectly (wirelessly), with one or more wearable mood devices 82 (hereafter referred to as the mood device 82). The term mood device as used herein refers to any wearable computer device configured to provide a user with stimulus associated with physiological mood changes (e.g., changes in anxiety, stress, happiness, sadness, calmness, relaxation, or the like) in humans. By way of example, a mood device 82 of the present invention may be in the form of a portable transdermal electrical stimulation (TES) applicator, such as a Thync Relax Pro™ from Thync, Inc, which provides electrical stimulation (neurostimulation) to effect a user's cognitive state. The present invention is not intended to be limited to particular mood changing techniques described herein, and other stimulus or combinations of stimulus determined to effect mood changes in humans may be utilized in conjunction with embodiments of the invention, such as light stimulus.

In aspects, the user computer device 80 is configured to receive a processed multimedia container 64 from the data synchronization server 60 or from the data provider 70. In embodiments, the user computer device 80 and the mood device 82 may each include one or more program modules (e.g., program module 42 of FIG. 1) executed by a respective user computer device 80 or mood device 82 to perform functions of the invention. In aspects, the user computer device 80 includes a data synchronization module 84 for processing data contained in a processed multimedia container 64. In aspects, the data synchronization module 84 can be utilized in conjunction with a codec module 86 configured to encode and/or decode streams of data contained within the processed multimedia container 64. The data synchronization module 84 and codec module 86 may be in the form of a television processor that receives the processed multimedia container 64 and is configured to extract and decode one or more primary streams of data 63 (e.g., video and audio data streams) and one or more streams of mood data therefrom. In aspects, the data synchronization module 84 works with hardware and software of the user computer device 80 (e.g., a smart television), such that the user computer device 80 is configured to present synchronized video and audio data to a user while providing one or more streams of mood data to the mood device 82. With this configuration, when a video stream is watched by a user through the user computer device 80 while wearing the mood device 82, the user receives mood information (stimulus) that matches the scene or character they are observing in the video stream.

In some embodiments of the present invention, a mood device module 88 of the user computer device 80 is configured to send one or more streams of mood data to the mood device 82, and the mood device 82 provides stimulus to a user based on the one or more streams of mood data. In alternative embodiments, the mood device 82 directly receives mood data (e.g., the processed multimedia container 64) from the data synchronization server 60 and utilizes its own data synchronization module 90 and codec module 92 (if necessary) to process the mood data.

Figure 3:
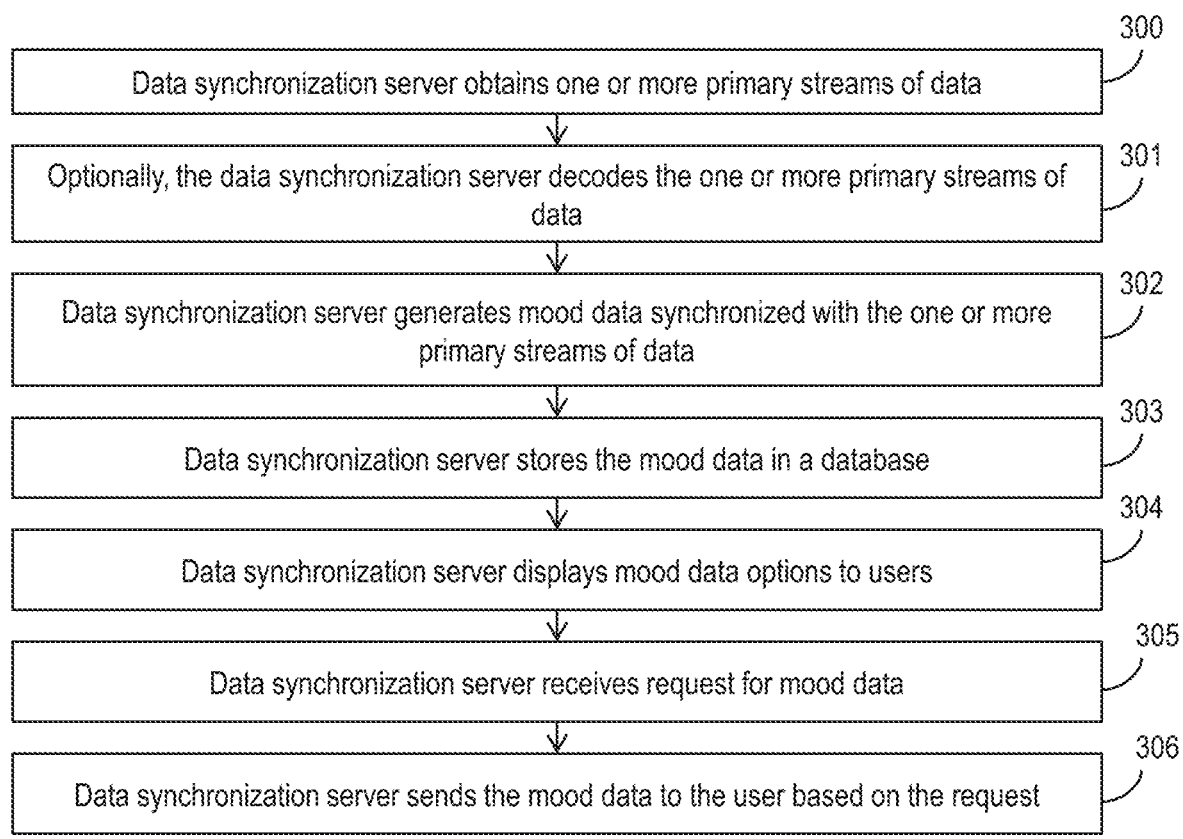
FIG. 3 shows a flowchart of steps of a method in accordance with aspects of the invention.

FIG. 3 shows a flowchart of a method in accordance with aspects of the invention. Steps of the method of FIG. 3 may be performed by components of the system 50 illustrated in FIG. 2, and are described with reference to elements shown in FIG. 2.

At step 300 the data synchronization server 60 obtains one or more primary streams of data 63. The term primary stream of data as used herein refers to a stream of data utilized in conjunction with mood data to enhance a user's experience of an event (e.g., digital event), such as a movie or a piece of music. In one example, the one or more primary streams of data 63 comprise data streams associated with a digital video, such as a movie or television show. Such data streams may include video, audio, closed-caption, and other types of data typically associated with a movie or television show. In embodiments, the one or more primary streams of data 63 are in the form of a prepackaged multimedia container. For example, a movie production or post-production company (e.g., represented by data provider server 70) may package streams of movie data including audio and video data streams in a multimedia container and may send or make available the prepackaged multimedia container to the data synchronization server 60 for further processing. Alternatively, raw or individual data streams may be provided to the data synchronization server 60 (e.g., from data provider server 70) for processing and packaging in accordance with embodiments of the invention.

At step 301 the data synchronization server 60 decodes the one or more primary streams of data 63 received at step 300, if necessary. In embodiments, the codec module 68 of the data synchronization server 60 performs step 301. For example, if the one or more primary streams of data 63 received at step 300 are in the form of encoded data, the codec module 68 of the data synchronization server 60 may be utilized to decode the data to enable further processing in accordance with the present invention. In alternative embodiments, no decoding of the one or more primary streams of data 63 is necessary, in which case step 301 is not performed.

At step 302, the data synchronization server 60 generates or creates mood data (digital mood data) synchronized with the one or more primary streams of data 63 received at step 301. Mood data may be generated as a data stream. In aspects, the mood data comprises one or more of: a mood stream identifier, mood type(s), intensity (e.g., intensity of stimulus utilized to generate associated mood) duration (e.g., duration of stimulus), and timestamps for linking/synchronizing the mood data with the one or more primary data streams 63 received at step 300. In embodiments, the mood data is encoded by the codec module 68 using a mood codec. In accordance with embodiments of the invention, a technician may utilize the data synchronization server 60 to generate a stream of mood data associated with the perceived changing moods or feelings of a character in a movie. This may comprise a technician tagging a video stream at various segments of the video stream to indicating changing moods or feelings of the character, and generating a stream of mood data associated with those changing moods or feelings. The data synchronization server 60 may utilize existing digital data processing methods similar to generating a subtitle data stream to generate mood data in accordance with embodiments of the invention. In aspects, the data synchronization server 60 may generate the mood data in the form of a multimedia container (e.g., the processed multimedia container 64) including the associated one or more primary streams of data 63.

At step 303, the data synchronization server 60 stores the mood data in a database. In embodiments, the mood data generated at step 302 is saved in the form of a multimedia container (e.g., processed multimedia container 64), along with the associated one or more primary streams of data 63 received at step 300. A codec for decoding the mood data may be associated with the stored mood data (e.g., processed multimedia container 64) to enable a device (e.g., user computer device 80 or the mood device 82) to decode and utilize the mood data.

Optionally, at step 304, the data synchronization server 60 may provide a list of selectable mood data options to one or more users through the network 55. For example, the data synchronization server 60 may make a list of movies available to the user computer device 80, and enable a user to select one of the movies from the list of movies for download or streaming to the user computer device 80 and/or mood device 82. In embodiments, selectable options provided to the user include options to select one of a plurality of different mood data streams associated with one or more primary streams of data 63. In one example, the selectable options enable a user to select between a mood track A associated with a first character in a movie, and a mood track B associated with a second character in the movie. In this way, a user may select the character whose mood and/or feelings the user wishes to experience while watching the movie.

At step 305, the data synchronization server 60 receives a request for mood data. In embodiments, the data synchronization server 60 receives a request from the user computer device 80 or from the mood device 82. In aspects, the request constitutes a selection of a processed multimedia container (e.g., digital movie container) including mood data, or a stand-alone mood data stream. In embodiments, the selection constitutes one of a plurality of mood streams (e.g., mood track A, mood track B) associated with a particular primary stream(s) of data 63.

At step 306, the data synchronization server 60 sends the mood data generated at step 302 to a user based on the request received at step 305. By way of example, the data synchronization server 60 may send a processed multimedia container 64 to the user computer device 80 or directly to the mood device 82. In an alternative example, the data synchronization server 60 may send a stand-alone mood data stream to the user computer device 80 or the mood device 82. In aspects, encoded mood data is sent to a user device with an accompanying mood codec to enable the device to decode and utilize the encoded mood data. The manner in which mood data is utilized by the user computer device 80 and/or the mood device 82 is described in detail below with respect to FIG. 7.

Figures 4, 5:
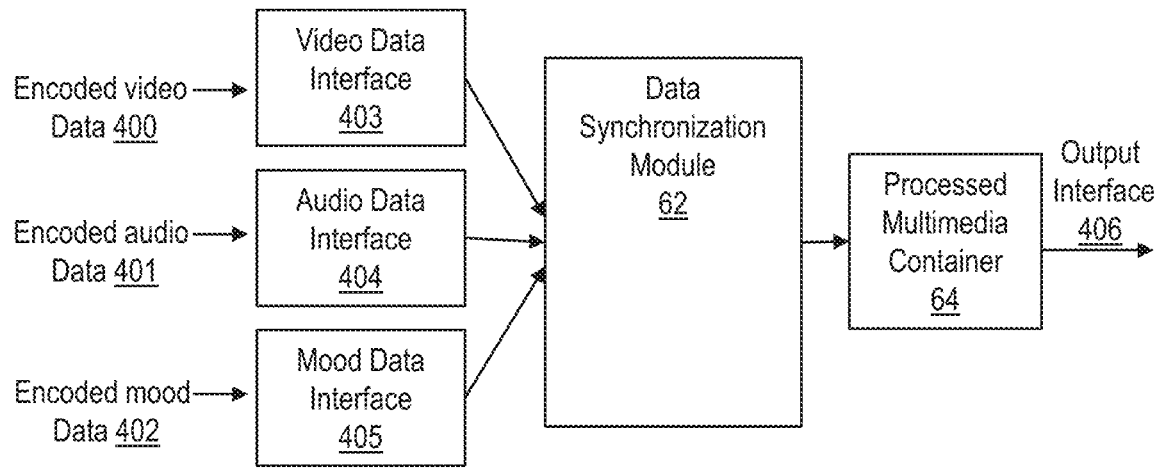
FIG. 4 is a flow diagram depicting the packaging of data in accordance with embodiments of the invention.
FIG. 5 shows exemplary mood data in accordance with embodiments of the invention.

FIG. 4 is a flow diagram depicting the packaging of data in accordance with embodiments of the invention. In embodiments, step 302 of FIG. 3 comprises the steps of packaging encoded video data 400, encoded audio data 401 and encoded mood data 402 into a processed multimedia container 64 of the present invention. In aspects, encoded video data 400 received at step 300 of FIG. 3 is received at a video data interface 403 of the data synchronization server 60; encoded audio data 401 received at step 300 is received at audio data interface 404 of the data synchronization server 60; and encoded mood data 402 generated by the data synchronization server 60 is received at a mood data interface 405. The data synchronization module 62 packages the encoded video data 400, audio data 401 and mood data 402 and outputs the data in a processed multimedia container 64. The processed multimedia container 64 may be stored in the database 66 and/or may be output to the user computer device 80 or mood device 82 through an output interface 406 of the data synchronization server 60.

FIG. 5 illustrates an example of mood stream data generated using JavaScript Object Notation (JSON) formatting in accordance with the method of FIG. 3. In the example of FIG. 5, the "startTick" and "stopTick" represent how long (in milliseconds) to transmit the mood information relative to a start of one or more primary streams of data 63 (e.g., the start of synchronized video and audio streams of the movie). The "moodType" is defined as a string and can include an intensity ("intensity"). By way of example, a mood type of "RELAXED" having an intensity of 10 on a scale of 1-10 is associated with parts of a video between "startTick" 0 and "stopTick" 10000. Similarly, a mood type ("moodType") of "SCARY" having an intensity of 4 on a scale of 1-10 is associated with parts of a video between "startTick" 50000 and "stopTick" 65000.

FIG. 6 illustrates an example of multiple mood data streams generated using JSON formatting in accordance with the method of FIG. 3. In the example of FIG. 6, the "timeCode" represent "hours:minutes:seconds:milliseconds" from the beginning of a movie (e.g., the start of synchronized video and audio streams of the movie) and the "duration" represents how long a particular mood type (e.g., "RELAXED") lasts from that starting point of the "time-Code". The "identifiers" allow more than one mood stream to be encoded into a processed multimedia container 64, and are referenced in the entries. In the example of FIG. 6, the entries are written in "timeCode" order, so they can be interlaced with the one or more primary streams of data 63 (e.g., audio/video streams) in such a way that any primary stream segment (e.g., audio/video stream segment) has the corresponding segment of mood data. By way of example, a mood type of "RELAXED" having an intensity of 10 on a scale of 1-10 is associated with the character "alice" in parts of a video starting at "'timeCode': '00:02:17.440'" for a duration of "00:00:15.000". Similarly, a mood type of "ENERGIZED" having an intensity of 4 on a scale of 1-10 is associated with the character "bob" in parts of the video starting at "'timeCode': '00:02:20.500'" for a duration of "00:00:20.000". As mood enhancing technology becomes more sophisticated, multiple mood types could potentially be listed within a single entry, with an intensity value for each.

Figure 7:
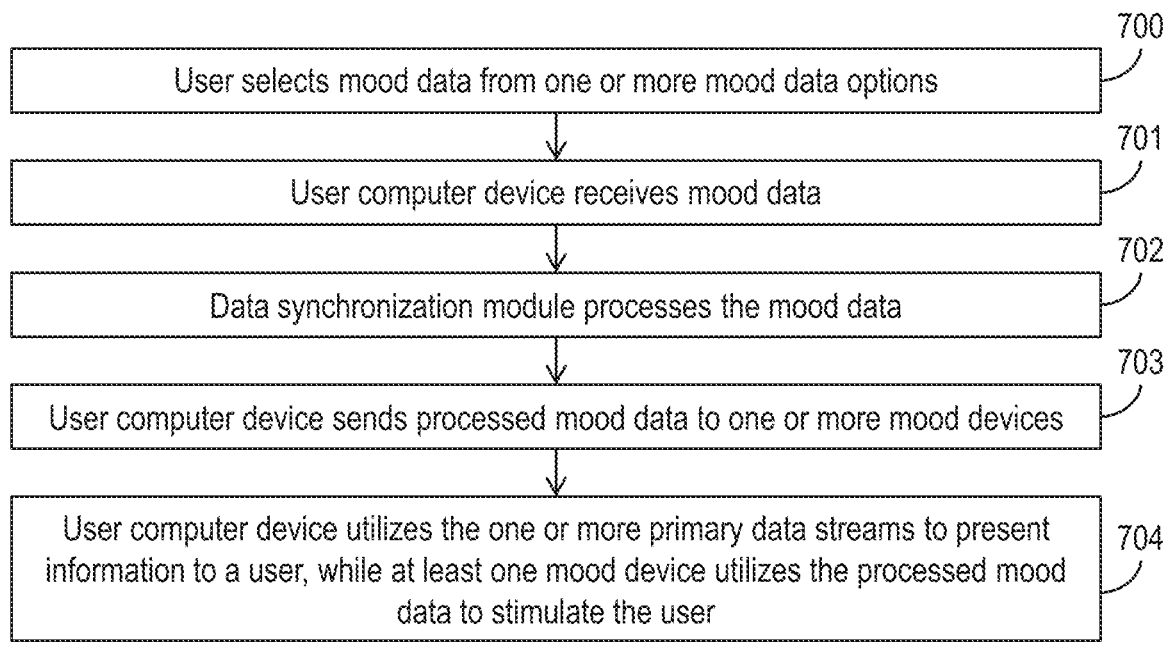
FIG. 7 shows a flowchart of steps of a method in accordance with aspects of the invention.

FIG. 7 shows a flowchart of a method in accordance with aspects of the invention. Steps of the method of FIG. 7 may be performed by components of the system 50 illustrated in FIG. 2, and are described with reference to elements shown in FIG. 2.

At step 700, a user selects mood data from one or more available mood data options. In embodiments, the user utilizes a user interface of the user computer device 80 to communicate via the network 55 with the data synchronization server 60 to view mood data that is available to the user computer device 80 through the data synchronization server 60. For example, the user may choose from a selection of movies that are available and that include associated mood data.

At step 701, the user computer device 80 receives the mood data requested at step 700. In embodiments, the mood data is received from the data synchronization server 60 via the network 55. In alternative embodiments, the mood data is received from another remote source (e.g., data provider server 70) who obtained the mood data from the data synchronization server 60. In embodiments, the mood data is provided in the processed multimedia container 64 and is accompanied by mood codec for decoding the mood data therein.

At step 702, the data synchronization module 84 of the user computer device 80 processes the mood data received at step 701. In embodiments, the data synchronization module 84 receives a stand-alone mood data stream and utilizes the data synchronization module 84 to link or synchronize the mood data stream to associated one or more primary streams of data 63 (e.g., video and audio data of a movie). By way of example, the user computer device 80 may receive a multimedia container for a movie from the data provider server 70, and the mood data stream received from the data synchronization server 60 at step 701 may be processed such that it is ready for synchronized use with the playing of the movie. In such embodiments, the data synchronization module 84 is configured to process the mood data stream in conjunction with the one or more primary data streams of data 63 of the movie. In embodiments, processing the mood data in step 701 comprises decoding the mood data using the codec module 86. In embodiments, the data synchronization module 84 decodes multiple mood data streams. In one example, the data synchronization module 84 decodes a first mood track A and a second mood track B, wherein each of the mood tracks is associated with a different series or arrangement of mood types.

Optionally, at step 703, the user computer device 80 sends the mood data of step 701 to one or more mood devices 82. In aspects, the mood device module 88 of the user computer device 80 sends processed mood data (e.g., decoded mood data) to the mood device 82. In alternative embodiments, the user computer device 80 sends unprocessed or encoded mood data to the mood device 82 for further processing (e.g., decoding by the codec module 92). In embodiments, the user computer device 80 streams the mood data to the mood device 82 as the one or more primary streams of data 63 associated therewith are presented to the user, such as through a display and/or speakers of the user computer device 80. Mood data may be sent from the user computer device 80 or from another source to the mood device 82 through the network 55, wirelessly, or through a direct connection. In embodiments, the user computer device 80 sends a first stream of processed mood data to a first mood device, and a second stream of processed mood data to a second mood device.

At step 704, the user computer device 80 utilizes the one or more primary streams of data 63 to present information to a user, while at least one mood device 82 utilizes the processed mood data to stimulate the user. In embodiments, the user computer device 80 includes a display for presenting the information from the one or more primary streams of data 63 to a user at the same time the mood device 82 stimulates the user based on the mood data linked to the one or more primary streams of data 63. For example, the one or more primary streams of data 63 may be in the form of a movie which is viewed by a user on the user computer device 80 while a mood device 82 utilizes the associated mood data to provide stimulation to the user to induce one or more predetermine mood types in the user. In embodiments, while the user computer device 80 plays a movie, mood data synchronized with the playing of the movie is streamed from the user computer device 80 to the mood device 82 to be experienced by a viewer of the movie. In aspects, the user computer device utilizes one or more primary data streams 63 to present information (e.g., a movie, including audio and visual information) to multiple users, while the multiple users simultaneously experience stimulation based on the processed mood data associated with the one or more primary data streams 63.

Figure 8:
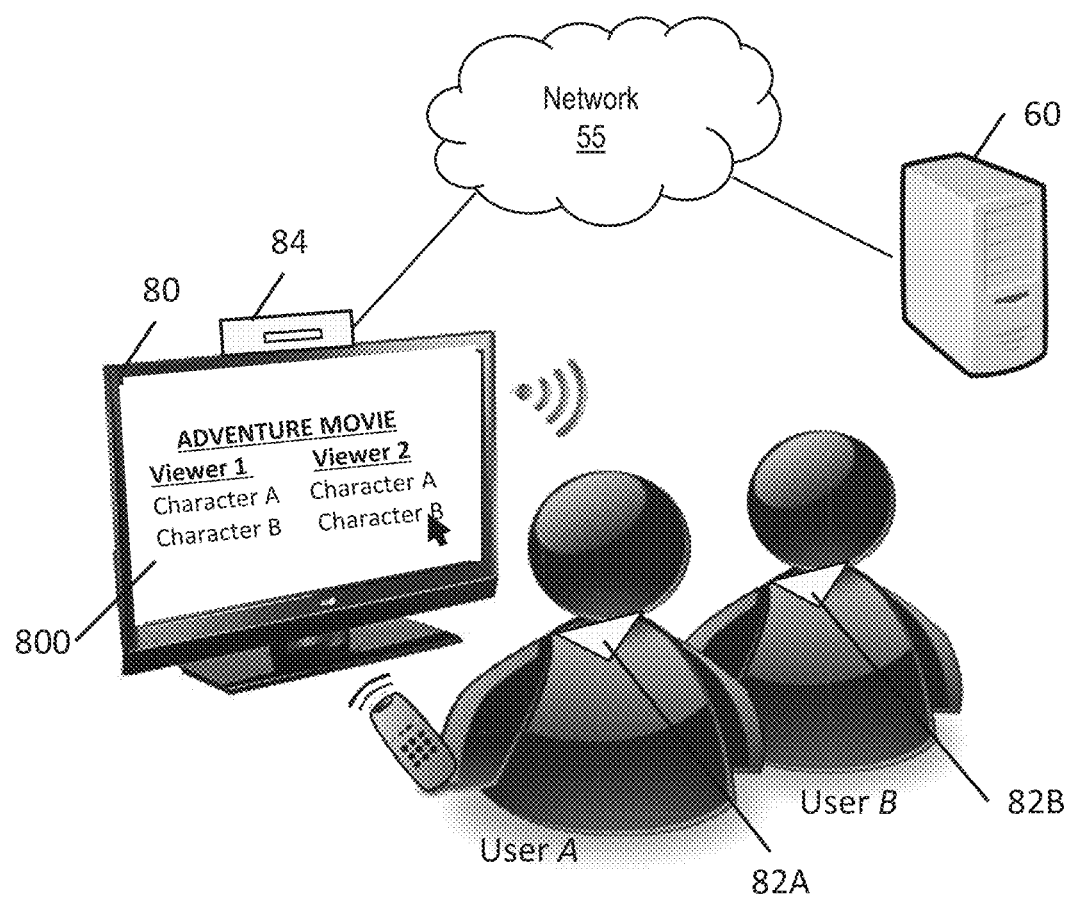
FIG. 8 shows an exemplary use scenario in accordance with embodiments of the present invention.

FIG. 8 shows an exemplary use scenario in accordance with aspects of the invention. In the scenario of FIG. 8, multiple users (User A and User B) are utilizing aspects of the system 50 to watch a movie on a display of the user computer device 80 with mood enhancements provided by respective mood devices 82A and 82B. In accordance with step 700 of FIG. 7, Users A and B utilizes the user computer device 80 to access a plurality of mood data options 800 available through the data synchronization server 60. In the example shown, a movie entitled ADVENTURE MOVIE includes mood data options for two characters of the movie, Character A and Character B. Mood data for Character A is associated with moods that enhance a viewer's experience from the perspective of Character A, while mood data for Character B is associated with moods that enhance a viewer's experience from the perspective of Character B. For example, a scene in ADVENTURE MOVIE may include Character A in a relaxed mood and Character B in an excited mood. In this example, User A selects mood data for Character A, while User B selects mood data for Character B in accordance with step 700 of FIG. 7. In response to the users' request, the data synchronization server 60 sends the selected mood data to the user computer device 80 via the network 55 for processing. In accordance with step 701 of FIG. 7, the user computer device 80 receives the mood data in the form of a processed multimedia container 64 including the one or more primary streams of data 63 associated with the movie (i.e., audio data, video data, etc.). The data synchronization module 84 of the user computer device 80 processes the received data in accordance with step 702 of FIG. 7. More specifically, the data synchronization module 84 utilizes a codec module 86 (depicted in FIG. 2) to decode encoded audio, video and mood data in the processed multimedia container 64, and enables the user computer device 80 to present the one or more primary streams of data 63 to a user in accordance with standard video display methods. In accordance with step 703 of FIG. 7, the user computer device 80 utilizes the mood device module 88 to stream mood data for Character A to the mood device 82A of User A, and to stream mood data for Character B to the mood device 82B of User B. In accordance with step 704 of FIG. 7, the user computer device 80 utilizes the one or more primary streams of data 63 to present ADVENTURE MOVIE to the users, while simultaneously streaming the mood data for Characters A and B to respective mood devices 82A and 82B for processing.

In an alternative example, in response to the users' request for mood data in accordance with step 305 of FIG. 3, the data synchronization server 60 sends the selected mood data to respective mood devices 82A and 82B via the network 55 for processing. In accordance with step 701 of FIG. 7, the mood devices 82A and 82B receive the mood data associated with the movie, while the user computer device 80 receives the one or more primary streams of data 63 associated with the movie (i.e., audio data, video data, etc.). The data synchronization module 90 of each of the respective mood devices 82A and 82B process the received mood data in accordance with step 702 of FIG. 7. More specifically, each data synchronization module 90 utilizes a codec module 92 (depicted in FIG. 2) to decode encoded mood data. In accordance with step 704 of FIG. 7, the mood device 82A utilizes mood data for Character A, and the mood device 82B utilizes the mood data for Character B while the user computer device 80 utilizes the one or more primary streams of data 63 to present ADVENTURE MOVIE to the users.

In the scenario of FIG. 8, the mood devices 82A and 82B utilize available neurostimulator technology and are configured to provide users with transdermal electrical stimulation (TES) of different types and intensities to stimulate moods or feelings in a user that are associated with corresponding moods or feelings (e.g., moodType) identified in the mood data. In embodiments, the data synchronization module 90 of each mood device 82A and 82B is configured to process the received mood data and determine the type, frequency and intensity of electrostimulation associated with the mood data. For example, a first class of cognitive effects induced by each of the mood devices 82A and 82B may include increased objective (i.e., physiological) energy levels, which the mood devices 82A and 82B may associated with the mood type "ENERGIZED" in the mood data. See, for example, the "'moodType': 'ENERGIZED'" depicted in the mood data of FIG. 6. A second class of cognitive effects induced by each of the mood devices 82A and 82B may include reduced physiological arousal, which the mood devices 82A and 82B may associated with the mood type "RELAXED" in the mood data. See, for example, the "'moodType': 'RELAXED'" depicted in the mood data of FIG. 6.

Accordingly, in one example, the mood device 82A provides User A with electrostimulation to induce feelings of increased energy levels based on mood data associated with the Character A experiencing excitement in the ADVENTURE MOVIE, while simultaneously, the mood device 82B provides User B with electrostimulation to induce feelings of decreased physiological arousal based on mood data associated with the Character B being in a state of relaxation in the ADVENTURE MOVIE. Thus, Users A and B have disparate enhanced movie watching experiences through the synchronization of movie data and mood data by the system 50.

Advantageously, embodiments of the present invention add a novel dimension to a viewer's movie-watching experience by enhancing or changing the viewer's moods or feelings about different scenes or characters, thereby providing more realism and intensity to their movie-watching experience. For example, the system 50 may provide improved impact of action scenes or emotional scenes in a movie by influencing the audiences emotional state. However, it should be understood that embodiments of the present invention may be utilized in conjunction with different user experiences. For example, embodiments of the present invention can be utilized to enhance music. Music has been known to have strong ties to emotional feelings in people. Mood data or mood codec may be added to a music data track or stream, such that a listener may utilize methods of the present invention to enhanced their experience of the music. Similarly, art galleries desiring to invoke emotional responses to art work may utilize aspects of the present invention to synchronize mood data with data associated with works of art (light data, sound data, video data, etc.). In another example, the present invention could be utilized in conjunction with a real-time live user experience, such as a roller-coaster or other theme park ride.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still another embodiment, the invention provides a computer-implemented method for generating synchronized multimedia streams including mood data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computing system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   obtaining, by a computing device, one or more primary streams of data;
   creating, by the computing device, digital mood data that is synchronized with the one or more primary streams of data, wherein the digital mood data causes a wearable mood device to provide a user with a physical stimulus associated with physiological mood changes in a synchronized manner with the one or more primary streams of data;
   storing, by the computing device, the digital mood data in a multimedia container with the one or more primary streams of data, wherein the multimedia container includes information needed for playback of the one or more primary streams of data and the digital mood data together;
   receiving, by the computing device, a request for the digital mood data; and
   sending, by the computing device, the digital mood data to the user based on the request.

2. The method of claim 1, wherein the digital mood data includes at least one component selected from the group consisting of: a mood stream identifier; a mood type; a mood intensity; a duration of a mood; and a timestamp for synchronizing the digital mood data with the one or more primary streams of data.

3. The method of claim 1, further comprising encoding, by the computing device, the digital mood data to obtain encoded mood data configured to be decoded with a mood codec.

4. The method of claim 1, wherein the digital mood data includes at least one mood type that corresponds to a neuro stimulation state of the wearable mood device to cause the wearable mood device to stimulate the user based on the mood type.

5. The method of claim 1, wherein the one or more primary data streams is selected from the group consisting of: audio data; video data; and combinations thereof.

6. The method of claim 1, wherein the digital mood data is a first stream of digital mood data, the method further comprising:
   creating, by the computing device, a second stream of digital mood data, wherein the second stream of digital mood data is different from the first stream of digital mood data, is synchronized with the one or more primary streams of data, and causes the wearable mood device to provide the user with stimulus associated with physiological mood changes in a synchronized manner with the one or more primary streams of data; and
   storing, by the computing device, the second stream of digital mood data in the multimedia container.

7. The method of claim 6, further comprising:
   receiving, by the computing device, a user selection of one of the first stream of digital mood data and the second stream of digital mood data from a remote user computer device, wherein the request comprises the user selection; and
   wherein the sending the digital mood data comprises transmitting, by the computing device, the selected one of the first stream of digital mood data and the second stream of digital mood data to the remote user computer device, wherein the selected one of the first stream of digital mood data and the second stream of digital mood data is synchronized with the one or more primary streams of data.

8. The method of claim 6, wherein the one or more primary streams of data comprise a movie; the first stream of digital mood data is associated with moods of a first character of the movie; and the second stream of digital mood data is associated with moods of a second character of the movie.

9. The method of claim 6, further comprising:
   receiving, by the computing device, a selection of the first stream of digital mood data for a first user, wherein the request comprises the user selection;
   receiving, by the computing device, a second user selection of the second stream of digital mood data for a second user;
   wherein the sending the digital mood data comprises transmitting, by the computing device, the first stream of digital mood data to a first user computer device, wherein the transmission synchronizes the first stream of digital mood data with the one or more primary streams of data; and
   transmitting, by the computing device, the second stream of digital mood data to a second user computer device, wherein the transmission synchronizes the second stream of digital mood data with the one or more primary streams of data.

10. A computer program product for generating synchronized multimedia streams including mood data, the computer program product comprising a computer readable storage medium having program instructions embodied therewith, the program instructions executable by a computing device to cause the computing device to:
    obtain one or more primary streams of data; and
    generate mood data that is synchronized with the one or more primary streams of data, the mood data comprising: a mood stream identifier; a mood type; a mood intensity; a duration of a mood; and a timestamp for synchronizing the mood data with the one or more primary streams of data, wherein the mood data is configured to be utilized by a mood device to provide a physical stimulation associated with physiological mood changes to a user.

11. The computer program product of claim 10, wherein the mood data is an encoded stream of mood data configured to be decoded with a mood codec.

12. The computer program product of claim 10, wherein the mood data includes at least one mood type that corresponds to a neurostimulation state of the mood device to cause the wearable mood device to physically stimulate the user based on the mood type.

13. The computer program product of claim 10, wherein the one or more primary data streams is selected from the group consisting of: audio data; video data; and combinations thereof.

14. The computer program product of claim 10, wherein the mood data is a first stream of mood data, and the program instructions are further executable by the computing device to cause the computing device to:
    generate a second stream of mood data, wherein the second stream of mood data is different from the first stream of mood data and is configured to be utilized by the mood device to provide a physical stimulation associated with physiological mood changes to the user; and store the first stream of mood data and the second stream of mood data in a multimedia container with one or more primary streams of data, wherein the multimedia container includes information needed for playback of the one or more primary streams of data and the first or second streams of mood data together.

15. The computer program product of claim 14, the program instructions are further executable by the computing device to cause the computing device to:
receive a user selection of one of the first stream of mood data and the second stream of mood data from a remote user computer device; and
transmit the selected one of the first stream of mood data and the second stream of mood data to the remote user computer device with the primary stream of data, wherein the selected one of the first stream of mood data and the second stream of mood data is synchronized with the primary stream of data.

16. The computer program product of claim 14, wherein the primary stream of data comprises a movie, the first stream of mood data is associated with moods of a first character of the movie, and the second stream of mood data is associated with moods of a second character of the movie.

17. The computer program product of claim 14, the program instructions are further executable by the computing device to cause the computing device to:
receive a selection of the first stream of mood data for a first user;
receive a second user selection of the second stream of mood data for a second user;
transmit the first stream of mood data to the mood device, wherein the transmission synchronizes the first stream of mood data with the primary stream of data; and
transmit the second stream of mood data to a second mood device, wherein the transmission synchronizes the second stream of mood data with the primary stream of data.

18. A system for generating synchronized multimedia streams including mood data, comprising:
a CPU, a computer readable memory and a computer readable storage medium associated with a computing device;
program instructions to obtain an encoded stream of video data;
program instructions to obtain an encoded stream of audio data;
program instructions to create an encoded stream of digital mood data synchronized with the encoded stream of video data and the encoded stream of audio data using timestamps, wherein the digital mood data is configured for use by a mood device to provide stimulation to a user;
program instructions to store the encoded stream of video data, the encoded stream of audio data, and the encoded stream of digital mood data in a multimedia container; and
program instructions to store the multimedia container in a database accessible to one or more remote user computer devices,
wherein the program instructions are stored on the computer readable storage medium for execution by the CPU via the computer readable memory.

19. The system of claim 18, wherein the digital mood data is a first stream of mood data and the first stream of mood data is configured for use by the mood device to provide a first electrical stimulation to the user in a synchronized manner with the encoded stream of video data and the encoded stream of audio data, the first electrical stimulation associated with one or more physiological mood changes selected from a group consisting of: changes in anxiety, changes in stress, changes in happiness, changes in sadness, changes in calmness and changes in relaxation, and the system further comprises:
program instructions to generate a second stream of mood data, wherein the second stream of mood data is different from the first stream of mood data and is configured for use by the mood device to provide a second electrical stimulation to the user in a synchronized manner with the encoded stream of video data and the encoded stream of audio data, the second electrical stimulation associated with one or more physiological mood changes selected from a group consisting of: changes in anxiety, changes in stress, changes in happiness, changes in sadness, changes in calmness and changes in relaxation;
program instructions to store the second stream of mood data in the multimedia container;
program instructions to present selectable options to the one or more remote user computer devices enabling a user to select one of the first stream of mood data and the second stream of mood data;
program instructions to receive a user selection of the selectable options; and
program instructions to transmit one of the first stream of mood data and the second stream of mood data based on the received user selection,
wherein the one or more primary streams of data comprise a movie; the first stream of digital mood data is associated with moods of a first character of the movie; and the second stream of digital mood data is associated with moods of a second character of the movie.

20. The system of claim 19, wherein the program instructions to transmit the one of the first stream of mood data and the second stream of mood data comprises:
program instructions to transmit the first stream of mood data to the mood device, wherein the mood device is configured to provide the first electrical stimulation to a first user based on the first stream of mood data; and
program instructions to transmit the second stream of mood data to a second mood device, wherein the second mood device is configured to provide the second electrical stimulation to a second user based on the second stream of mood data.

* * * * *